United States Patent [19]
Parsons

[11] 3,841,645
[45] Oct. 15, 1974

[54] THROUGH HOLE MACHINE TOOL COLLET

[75] Inventor: Hubert J. Parsons, Horseheads, N.Y.

[73] Assignee: Hardinge Brothers Inc., Elmira, N.Y.

[22] Filed: Oct. 4, 1972

[21] Appl. No.: 295,017

[52] U.S. Cl............... 279/1 A, 279/43, 279/50
[51] Int. Cl............................................. B23b 31/20
[58] Field of Search ............. 279/1 A, 1 F, 1 L, 50, 279/48, 46, 46 A, 37, 43, 57, 1 SJ, 1 Q

[56] References Cited
UNITED STATES PATENTS

| | | | |
|---|---|---|---|
| 1,582,445 | 4/1926 | Border | 279/46 |
| 2,493,926 | 1/1950 | Petsche | 279/1 F |
| 3,411,796 | 11/1968 | Decker | 279/46 |
| 3,542,384 | 11/1970 | Speed | 279/46 |
| 3,659,863 | 5/1972 | Buttner | 279/50 X |

FOREIGN PATENTS OR APPLICATIONS

| | | | |
|---|---|---|---|
| 751,613 | 7/1956 | Great Britain | 279/46 |

Primary Examiner—Andrew R. Juhasz
Assistant Examiner—Z. R. Bilinsky
Attorney, Agent, or Firm—Shlesinger, Arkwright, Garvey & Dinsmore

[57] ABSTRACT

A work gripping device for a machine tool spindle comprising: a collet for mounting on said spindle, the collet comprising a tubular member having a plurality of longitudinally extending furcations and an axial passageway therethrough, insert means mounted in the collet passageway, the insert means having a work receiving passageway therethrough substantially coaxial with the collet passageway, the insert means including work engaging means forming at least a portion of the work receiving passageway, and spring means resiliently connecting the insert means and the collet, the insert means including spindle engaging abutment means extending radially beyond the collet so that the abutment means contacts the spindle when the collet is closed, the spring means being positioned radially outward from the work receiving passageway.

34 Claims, 10 Drawing Figures 3,841,645

3,841,645

THROUGH HOLE MACHINE TOOL COLLET

SUMMARY OF THE INVENTION

This invention relates to a collet and collet insert assembly for use on a machine tool. More particularly, the invention pertains to a master collet and a number of interchangeable collet inserts which render the assembly capable of functioning in either a "through hole" mode or a "dead length stop" mode. This interchangeability is achieved by positioning spring means for connecting the collet and insert member radially outward from the work receiving passageway.

BACKGROUND AND OBJECTS OF THE INVENTION

Prior art collets typically comprise a tubular body having means at one end for attachment to a draw tube, a slotted work gripping portion at the other end, a cylindrical inner surface, and a tapered outer surface being arranged for contact with a cooperating tapered portion of the spindle. When the draw tube is pulled rearwardly, the tapered surfaces coact to close the work gripping jaws onto the workpiece.

Due to the nature of the specific workpieces to be held by the collet or the character of the machining operation, it has often been necessary to employ various types of insert members to properly position or secure the workpiece. One such collet insert is a stop member which is positioned within the collet and contacts the workpiece as it is inserted therein. Another class of collet inserts which are frequently used when the inner surfaces of the collet is not adapted to grip a workpiece having an irregular contour are collet pads. These pads are adapted to be secured to the inner surface of the individual collet segments and have jaws which are shaped such that the workpiece is securely gripped by them.

Often during the course of successive machining operations, it may be desirable to feed the barstock into the collet from the front or to operate the machine in the "through hole" mode where the barstock is fed through the collet from the rear. Furthermore, it may be desirable to employ a stop member in one operation and collet pads in another depending on the nature of the workpiece, the precision of the machining which is required, the nature of the tool, etc. in most prior art devices, when switching from one mode to another, it is necessary that the master collets be changed thereby rendering the operation less efficient.

Another disadvantage to prior art collets, whether or not used in combination with an insert member, has been that when the collet jaws are forced radially inward, the internal work engaging surfaces of the individual jaw members tend to pivot about the solid body portion. This results in the workpiece being gripped primarily by the front portion of the collet thereby reducing the contact between the work engaging surfaces and the workpiece. This causes a reduction in the work gripping force as well as excessive wear of the forward portions of the internal jaw surfaces.

It is, therefore, an object of this invention to provide a collet and collet insert assembly capable of "through hole" operation and "dead length stop" operation with a minimum of part changes and particularly without the necessity for changing the master collet.

A further object of this invention is to provide a collet and a collet insert assembly wherein the collet insert is urged into the machine spindle by the master collet through a spring mechanism.

A further object of this invention us to provide a collet and collet insert assembly which includes an interchangeable spacer ring to precisely limit the closing position of the work gripping jaws along the machine axis.

A still further object of this invention is to provide a collet and collet insert assembly including work gripping pads which close in a parallel manner when radial inward force is exerted on them by the master collet.

Yet another object of this invention is to provide a collet and collet insert assembly which applies an improved gripping force to more securely support the workpiece when their diameters vary in size.

Still another object of this invention is to provide a collet and collet insert assembly which has work engaging surfaces which seat on the workpiece more uniformly thereby evenly distributing the load on the gripping surfaces.

Yet another object of this invention is to provide a collet and collet assembly which distributes the wear on the work engaging surfaces of the collet insert.

A still further object of this invention is to provide a collet and collet insert assembly including a stop member which may be mounted therein.

Still another object of this invention is to provide a collet and collet insert assembly including a work stop whereby extremely precise machining may be carried out.

Yet a further object of this invention is to provide a collet and collet insert assembly including a work stop member which maintains accuracy of workpiece position regardless of wear on the cam surfaces of the collet or collet insert or of diametrical variations in successive work pieces.

These and other objects and advantages of this invention will be apparent from the following description and claims.

In the accompanying drawings which illustrate by way of example various embodiments of this invention:

FIGS. 1 THROUGH 4

Figure 1:
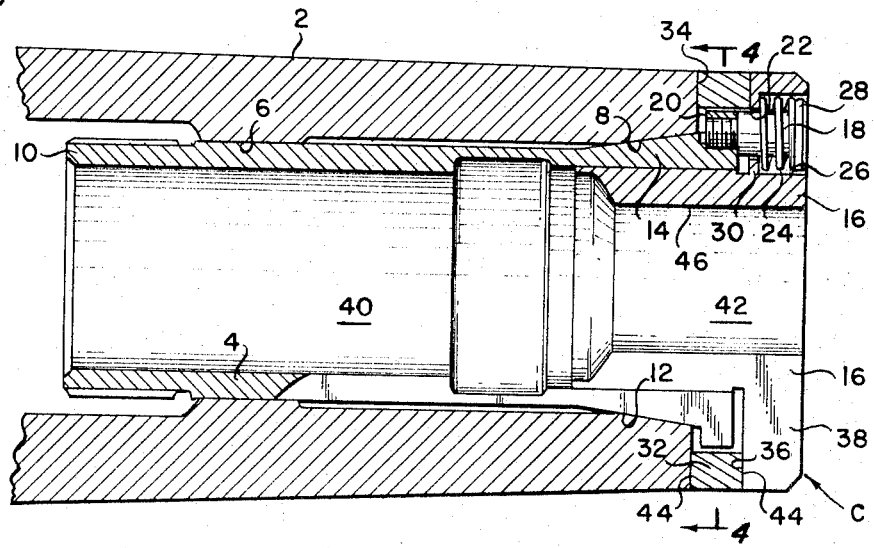
FIG. 1 is a side elevational view in section showing one embodiment of the invention.
Figure 2:
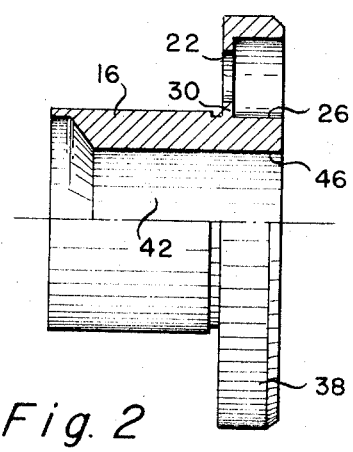
FIG. 2 is a side elevational view of the insert assembly shown in FIG. 1 with a portion thereof shown in section to show its structure more clearly.
Figure 3:
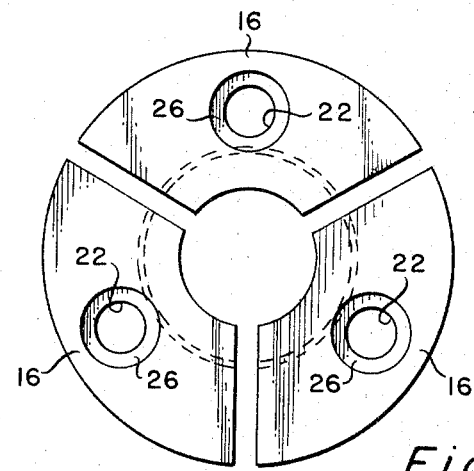
FIG. 3 is an end view of the insert assembly shown in FIG. 2.
Figure 4:
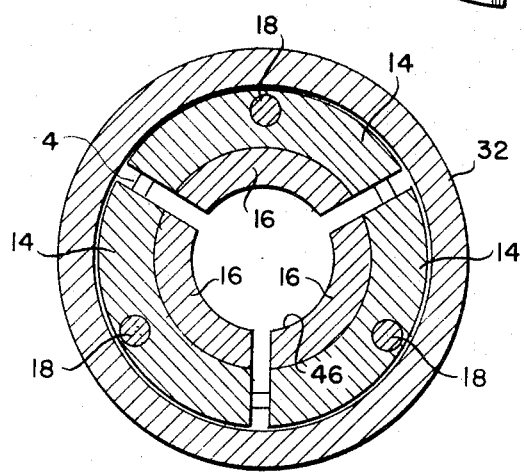
FIG. 4 is a cross sectional view of the embodiment shown in FIG. 1 taken along line 4—4 and viewed in the direction of the arrows.

Spindle 2, which is mounted on a lathe (not shown) in the usual manner, supports master collet 4 at diameter 6 and cam surface 8. Master collet 4 is generally tubular and includes draw means (not shown) on its rearward end 10 and a plurality of jaws 14 which extend forwardly. Jaws 14 are provided with cam surfaces 12 which cooperate with spindle cam surface 8 as master collet 4 is drawn rearwardly in spindle 2 so as to force jaws 14 radially inward.

A plurality of insert pads 16 are mounted on the jaws 14 of master collet 4 by means of pins 18 which pass through apertures 22 and are threadedly or otherwise secured to flange 20. Concentric coil springs 24, disposed within spring chambers 26, are compressed between pinheads 28 and annular shoulders 30. While the use of a coil spring 24 is preferred, other spring mechanisms such as Bellville springs, etc. may be employed. A spacer ring 32 is disposed around master collet 4 between the forward surface 34 of spindle 2 and the rear surface 36 of insert flange 38. Ring 32 is held in place when the entire collet and insert assembly C is removed from the spindle by the radially outward spread of the master collet 4 causing it to grip the spacer ring inner diameter.

OPERATION OF FIGS. 1 THROUGH 4

As master collet 4 is drawn rearwardly by the draw tube (not shown) in the normal manner, pins 18 are carried with it because of their rigid attachment to flange 20. As pins 18 travel rearwardly, they compress spring 24 against shoulder 30 thereby resiliently urging insert pads 16 rearwardly also. When the rear surfaces 36 of insert flanges 38 abut spacer ring 32 which abuts the forward surface 34 of spindle 2, the rearward movement of insert pads 16 is arrested. As master collet 4 continues to be drawn rearwardly, springs 24 are compressed and cam surfaces 8 and 12 coact to force jaws 14 radially inward. Jaws 14 in turn force insert pads 16 radially inward thereby gripping the workpiece (not shown) which extends through collet passageway 40 and work receiving passageway 42. Since inset pads 16 are independent from one another, they will be closed only under the action of the individual collet jaw 14 to which they are secured by pin 18.

Because the forward surface 34 of spindle 2, the rear surface 36 of flange 38, and the outer surfaces 44 of spacer ring 32 are squared off, the work engaging surfaces 46 of insert pads 16 will at all times be maintained in a position parallel to the axis of passageway 42. Even though jaws 14 will pivot slightly when they are closed, the fact that insert pads 16 are resiliently fastened to jaws 14 allows them sufficient freedom of movement so that the action of the springs 24 will maintain them flush against spacer ring 32 as they close. This unexpected functioning of pads 16 achieves the aforementioned results of uniform workpiece engagement along the length of work engaging surfaces 46 thereby achieving a more secure grip on the workpiece without undue wear at the forward portion of the pads 16. A further advantage of this type of collet assembly is that the position along the machine axis where the surfaces 46 engage the workpiece may be established with great precision by merely selecting the thickness of the spacer ring 32. In this manner, neither the amount of wear of the cam surfaces 8 and 12, nor the diameter of the workpiece which is being machined will effect the axial position at which surfaces 46 grip the workpiece because only the master collet 4 is required to move rearwardly to close insert pads 16 after the abutment of spindle 2, spacer ring 32 and flange 38 occurs. Such an arrangement provides great precision in machining by eliminating the influence of variances in workpiece size and cam surface contours.

FIGS. 5 THROUGH 7

Figure 5:
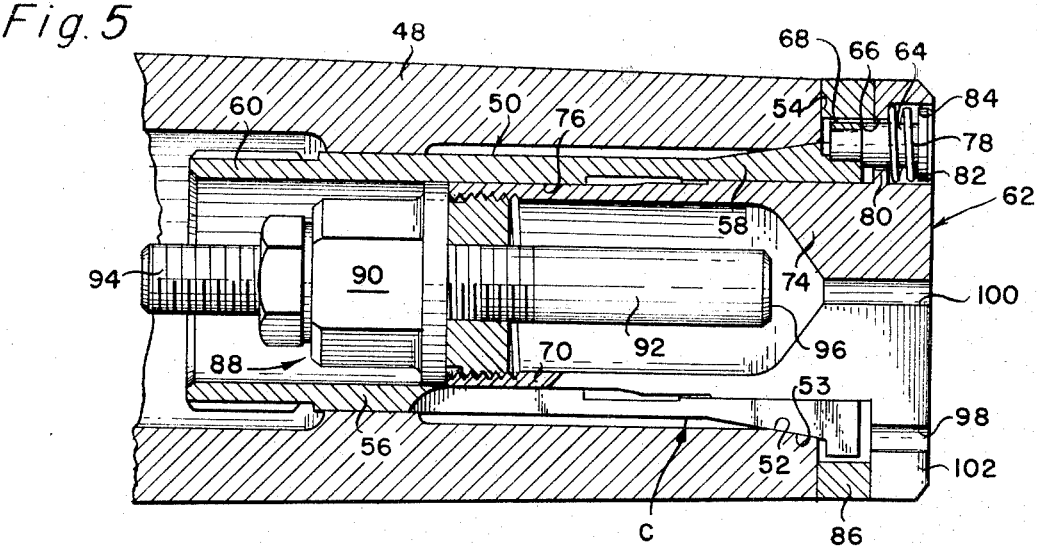
FIG. 5 is a side elevational view in section of a second embodiment of the invention.
Figure 6:
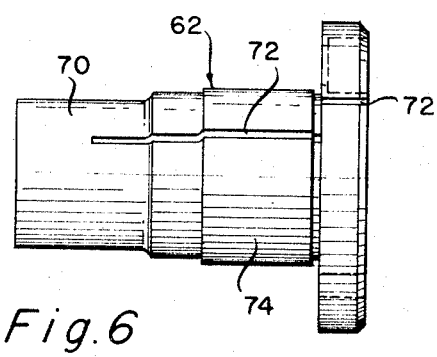
FIG. 6 is a side elevational view of the insert member shown in FIG. 5.
Figure 7:
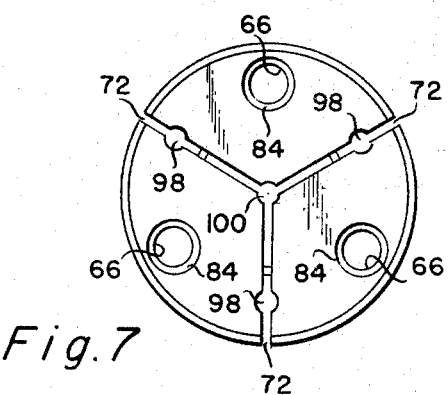
FIG. 7 is an end view of the insert member shown in FIG. 6.

A variation on the collet and collet insert assembly shown in FIGS. 1 through 4 is illustrated in FIGS. 5 through 7. This arrangement is especially useful when it is desirable to quickly switch from "through hole" machining where the barstock is fed from the rear of the collet to "dead length" machining where the barstock or workpiece is inserted into the collet from the front and precise positioning thereof is required.

Spindle 48, which is identical to the one shown in FIG. 1, includes a cam surface 52 and a forward abutment surface 54. Master collet 50 is also identical to the one shown in FIG. 1 and comprises a tubular central portion 56 having a plurality of finger-like jaws 58 extending therefrom in a forward direction. The rear portion 60 of collet 50 is provided with means (not shown) for connection to a suitable drawing tube (not shown). Insert member 62 is mounted on master collet 50 by means of pins 64 which pass through apertures 66 and are threadedly or otherwise secured to flange 68. Insert member 62 differs from the insert pads of the embodiment shown in FIG. 1 in that it comprises a tubular rear portion 70 having a plurality of longitudinal slots 72 therein forming a plurality of finger-like jaws 74. Insert member 62 is supported by the inner surface 76 of master collet 50 and is capable of reciprocation relative thereto. Coil springs 78, which are concentric with pins 64, are compressed by annular shoulder 80 and pinhead 82. It should be noted that the dimensions of spring chambers 84 and apertures 66 are such that pins 64 are free to reciprocate therein. Spacer ring 86 is disposed around master collet 50 and serves to limit the rearward movement of insert member 62 as the collet assembly C is closed. Threadedly mounted within insert member 62 is adjustable stop member 88 comprising adapter member 90 and stop pin 92 threadedly secured therein. Because of the cooperation of the threads 94 of stop pin 92 and the internally threaded bore (not shown) of adapter 90, the position of the forward surface 96 of stop pin 92 along the machine axis may be varied. It should be noted that since stop member 88 is threadedly mounted in insert member 62, it may be removed or installed very quickly thereby permitting the collet and collet insert assembly C to function in either a "through hole" mode or a "dead length stop" mode with a minimum of part changes.

In prior art devices wherein additional jaws or pads have been utilized in a collet, difficulty in achieving concentricity of the work gripping surface has arisen. This is overcome in the following manner. A plurality of recesses 98 are formed in the jaws 74 of insert member 62 adjacent slots 72. Suitable pins (not shown) are temporarily inserted into the recesses 98 and the collet and collet insert assembly 50, 62 are drawn into the spindle 48. The jaws 74 close down on the pins and a suitable boring tool (not shown) is used to enlarge the work gripping surfaces 100 to the required diameter for a given workpiece. It should be noted that this provision for achieving jaw concentricity could also be included in the embodiments shown in FIGS. 1 and 8.

OPERATION OF FIGS. 5 THROUGH 7

As master collet 50 is drawn rearwardly by a suitable draw tube (not shown), springs 78 are compressed by pin 82 and the insert member 62 is urged rearwardly also. When insert member flange 102 abuts spacer ring 86, the rearward motion of insert member 62 is arrested and only the master collet 50 continues to move thereby compressing springs 78 and closing jaws 74 by the coaction of cam surfaces 52 and 53. In this manner, the position along the machine axis at which work gripping surfaces 100 engage the workpiece (not shown) is determined only by the thickness of spacer ring 86. The distance which the workpiece can be inserted in insert member 62 is determined by the axial position of the forward surface 96 of stop pin 92. It can be seen therefore, that extremely precise machining may be achieved regardless of the diameter of the workpiece or the amount of wear of cam surfaces 52 and 53.

FIGS. 8 THROUGH 10

Figure 8:
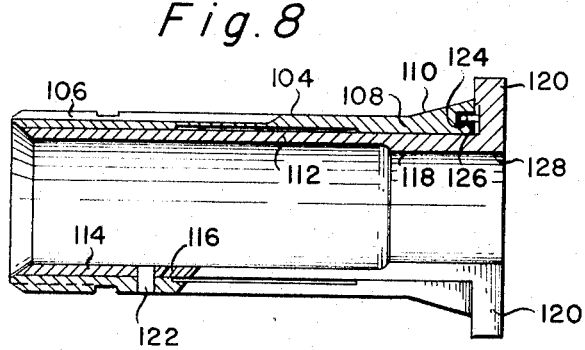
FIG. 8 is a side elevational view in section of a third embodiment of the invention.
Figure 10:
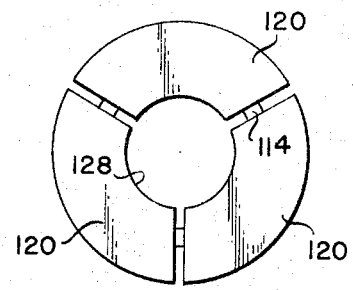
FIG. 10 is an end view of the insert member shown in FIG. 9.
Figure 9:
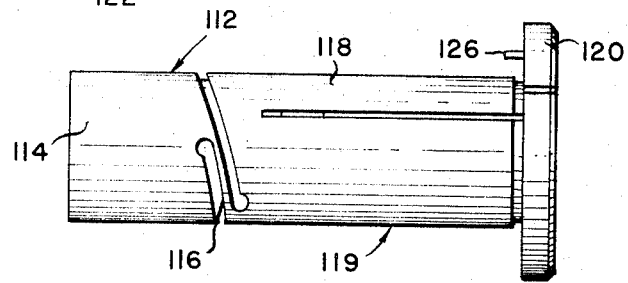
FIG. 9 is a side elevational view of the insert member shown in FIG. 8.

A variation of the collet and collet insert assembly shown in FIG. 5 is illustrated in FIGS. 8 through 10. Master collet 104 comprises a tubular rear portion 106 and a plurality of finger-like jaws 108 extending therefrom. Jaws 108 are provided with cam surfaces 110 which are adapted to cooperate with the cam surface of a standard spindle (not shown) so as to force the jaws 108 radially inward when the collet 106 is drawn into the spindle. Insert member 112 is mounted within collet 106 and comprises a tubular rear portion 114 having helical slots 116 therein and a plurality of finger-like jaws 118 extending therefrom. Jaws 118 are provided with arcuate flange portions 120 which extend radially beyond collet 104 so as to abut the spindle or spacer ring (not shown) in a manner similar to that of the previously described embodiments. The rear portion 114 of insert member 112 is cemented, welded or otherwise secured to the rear portion 106 of master collet 104 and a pin (not shown) passes through aligned apertures 122 thereby rigidly connecting the rear portions 106 and 114 of collet 104 and insert member 112, respectively. The jaw portion 119 of insert member 112, on the other hand, is free to reciprocate relative to collet 104.

One of the jaws 118 is provided with a bore 124 for receiving a pin or key 126 which is rigidly connected to flange 120. The pin 126 is positioned in such that it will engage the bore 124 in the jaw 118. In this manner, the jaws 118 will be restrained from rotating with respect to the collet jaws 108 and will be aligned in the same position each time the insert member 122 is assembled in the collet 104. This assures the accuracy of the concentricity of the work gripping surfaces 128.

OPERATION OF FIGS. 8 THROUGH 10

As collet 104 is drawn rearwardly into the spindle (not shown) by means of a suitable draw tube (not shown), the rear portion 114 of insert member 112 will also be carried rearwardly due to the rigid connection of the rear portions 106 and 114. When flanges 120 abut the spindle or spacer ring the movement of jaws 118 is arrested and the continued rearward movement of rear portions 106 and 114 will serve to expand the integral spring formed by helical slots 116. As cam surfaces 110 coact with the spindle cam surface (not shown), the jaws 118 will be forced radially inward thereby bringing the work engaging surfaces into contact with the work piece.

While this invention has been described as having a preferred design, it will be understood that it is capable of further modification. The application is, therefore, intended to cover any variation, use, or adaptations of the invention following the general principles of this invention and including such departures from the present disclosure as come within known or customary practice in the art which this invention pertains, and as may be applied to the essential features hereinbefore set forth and fall within the scope of this invention or the limits of the appended claims.

What I claim is:

1. A working gripping device for a machine tool spindle comprising:
    a. a collet for mounting on said spindle, said collet comprising a tubular member having a plurality of longitudinally extending furcations,
    b. said collet having an axial passageway therethrough,
    c. insert means mounted in said collet passageway,
    d. said insert means having a work receiving passageway therethrough substantially coaxial with said collet passageway,
    e. said insert means including work engaging means forming at least a portion of said work receiving passageway, and
    f. spring means resiliently connecting said insert means and said collet,
    g. said insert means including spindle engaging abutment means extending radially beyond said collet so that said abutment means contacts said spindle when said collet is closed,
    h. said spring means being positioned radially outward from said work receiving passageway.

2. A work gripping device as in claim 1 and wherein:
    a. said spring means includes a spring and means for deforming said spring when said collet is closed.

3. A work gripping device as in claim 2 and wherein:
    a. said abutment means is provided with a plurality of apertures therein, and
    b. said deforming means includes pins passing through said apertures and secured to said collet.

4. A work gripping device as in claim 3 and wherein:
    a. said pins have enlarged heads which engage said springs.

5. A work gripping device as in claim 3 and wherein:
    a. said insert means comprises a tubular body having a plurality of longitudinal slots extending from one end of said tubular body toward the other end of said tubular body and terminating short thereof for dividing said tubular body member into a tubular section having a plurality of fingers extending therefrom.

6. A work gripping device as in claim 5 and wherein:
    a. each of said fingers has a recess adjacent each of said slots extending rearwardly parallel to the longitudinal axis of said tubular body member from the front of said fingers.

7. A work gripping device as in claim 5 and wherein:

a. said abutment means includes an apertured shoulder on the free end of each of said fingers.

8. A work gripping device as in claim 7 and wherein:

a. said collet has a forward portion and a rearward portion,
   b. said collet forward portion is provided with a flange adjacent said finger shoulders,
   c. said collet flange is provided with a plurality of means for receiving said pins and securing said pins thereto.

9. A work gripping device as in claim 7 and wherein:

a. said spring means includes coil springs positioned around said pins and concentric therewith.

10. A work gripping device as in claim 5 and including:

a. work stop means mounted within said work receiving passageway.

11. A work gripping device as in claim 3 and wherein:

a. said insert means comprises a plurality of independent pad members abutting the inner surface of said collet.

12. A work gripping device as in claim 11 and wherein:

a. said pad members have forward portions and rearward portions, and
    b. said abutment means includes an apertured shoulder on the forward portion of each of said pad members.

13. A work gripping device as in claim 12 and wherein:

a. said collet has a forward portion and a rearward portion,
    b. said collet forward portion is provided with a flange adjacent said pad member shoulders,
    c. said collet flange is provided with a plurality of means for receiving said pins and securing said pins thereto.

14. A work gripping device as in claim 12 and wherein:

a. said spring means includes coil springs positioned around said pins and concentric therewith.

15. A work gripping device as in claim 11 and wherein:

a. each of said pads has a recess adjacent each of said longitudinal slots extending rearwardly parallel to the longitudinal axis of said work receiving passageway from the front of said pads.

16. A work gripping device as in claim 3 and wherein:

a. said insert means comprises a tubular body having a plurality of longitudinal slots extending from the forward end of said body toward the rearward end of said body and terminating short thereof for dividing said tubular body into a tubular section having a plurality of fingers extending therefrom,
    b. said spring means comprises a tubular body having a circumferential substantially helical slot therein, said second mentioned tubular body being rigidly connected to said first mentioned tubular body and coaxial therewith.

17. A work gripping device as in claim 16 and wherein:

a. said first and second mentioned tubular bodies are integral.

18. A work gripping device as in claim 17 and wherein:

a. said abutment means includes a shoulder on the forward end of said fingers.

19. A work gripping device as in claim 16 and including:

a. means for securing said spring means to said collet.

20. A work gripping device as in claim 19 and wherein:

a. said securing means includes a pin.

21. A work gripping device as in claim 20 and wherein:

a. said securing means includes cement means associated with said pin.

22. A work gripping device as in claim 16 and wherein:

a. each of said fingers has a recess adjacent each of said longitudinal slots extending rearwardly parallel to the longitudinal axis of said tubular body member from the front of said fingers.

23. A work gripping device as in claim 1 and including:

a. means for preventing relative rotation of said collet and said insert member.

24. A work gripping device as in claim 23 and wherein:

a. said preventing means includes cooperating key means on said collet and said insert means.

25. A work gripping device as in claim 1 and wherein:

a. said abutment means includes an annular spacer washer.

26. A work gripping device as in claim 25 and wherein:

a. said washer encompasses said collet.

27. A work gripping device as in claim 26 and wherein:

a. said washer has an inner diameter such that it is in snug engagement with said collet when said collet is open.

28. A work gripping device for a machine tool spindle comprising:

a. a collet for mounting on said spindle,
    b. said collet having an axial passageway therein, and,
    c. insert means mounted on said collet,
    d. said insert means having a work receiving passageway therein substantially coaxial with said collet passageway,
    e. said insert means including work engaging means forming at least a portion of said work receiving passageway,
    f. said insert means being provided with a flange means means for resiliently connecting said collet and said insert flange means,
    g. a portion of said flange means extending radially beyond said collet.

29. A work gripping device for a machine tool spindle comprising:

a. a collet for mounting on said spindle and comprising a tubular portion having a plurality of fingers extending longitudinally therefrom in a forward direction, b. said collet having an axial passageway therein,
c. a plurality of independent pad members mounted on the free ends of at least some of said collet fingers,
d. said pad members comprising a first portion partially disposed within said passageway and a second portion extending radially beyond said collet fingers,
e. spring means for resiliently connecting said collet fingers and said pad members second portion,
f. said pad member first portions including work engaging means.

30. A work gripping device as in claim 29 and including:
   a. stop means associated with said spindle for abutting a portion of said pad member second portions when said collet is closed.

31. A work gripping device as in claim 30 and wherein:
   a. said stop means has a substantially flat surface perpendicular to said collet passageway, and
   b. said pad member second portions have substantially flat surfaces perpendicular to said collet passageway which abut said stop means flat surface when said collet is closed.

32. A work gripping device as in claim 31 and wherein:
   a. said spring means includes a plurality of spring biased pins passing through said pad member second portions and being secured to said collet fingers.

33. A work gripping device as in claim 31 and wherein:
   a. said stop means includes an annular spacer washer encompassing said collet.

34. A work gripping device for a machine tool spindle comprising:
   a. a collet for mounting on said spindle,
   b. said collet having an axial passageway therethrough, and
   c. a tubular insert member mounted in said collet,
   d. said insert member having a work receiving passageway therethrough coaxial with said collet passageway,
   e. said insert member comprising: a tubular body having a flange at its forward end, said tubular body having a plurality of longitudinal slots extending from the forward end of said body toward the rearward end of said body and terminating short thereof for dividing said tubular body into a tubular section having a plurality of fingers extending therefrom,
   f. said tubular section having a forward and a rearward portion,
   g. said forward portion having a circumferential helical slot therein,
   h. said rearward portion being rigidly secured to said collet,
   i. said flange extending radially beyond said collet.

* * * * *